United States Patent
Bortoli et al.

(10) Patent No.: US 11,834,998 B2
(45) Date of Patent: Dec. 5, 2023

(54) TRANSMISSION SYSTEMS HAVING CLUTCH AT OUTPUT SIDE

(71) Applicant: Hamilton Sundstrand Corporation, Charlotte, NC (US)

(72) Inventors: Stephen Michael Bortoli, Roscoe, IL (US); Aaron M. Finke, Janesville, WI (US); Mark J. Franklin, Janesville, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 758 days.

(21) Appl. No.: 16/388,548

(22) Filed: Apr. 18, 2019

(65) Prior Publication Data

US 2020/0332720 A1 Oct. 22, 2020

(51) Int. Cl.
*F02C 7/32* (2006.01)
*F16H 3/08* (2006.01)
*F16H 61/04* (2006.01)

(52) U.S. Cl.
CPC .................. *F02C 7/32* (2013.01); *F16H 3/08* (2013.01); *F16H 61/0403* (2013.01); *F05D 2220/323* (2013.01); *F05D 2260/4031* (2013.01)

(58) Field of Classification Search
CPC ...... F02C 7/32; F02C 7/36; F16H 3/08; F16H 61/0403; F05D 2220/323; F05D 2260/4031; Y02T 50/60
See application file for complete search history.

(56) References Cited

U.S. PATENT DOCUMENTS

| | | | |
|---|---|---|---|
| 3,441,116 A | 4/1969 | Quenneville | |
| 6,332,371 B1 * | 12/2001 | Ohashi | F16H 3/093 |
| | | | 74/331 |
| 6,546,830 B2 * | 4/2003 | Kanazawa | B60K 17/351 |
| | | | 74/665 G |
| 6,647,817 B2 * | 11/2003 | Kobayashi | F16H 61/04 |
| | | | 74/331 |
| 6,810,772 B2 | 11/2004 | Hori et al. | |
| 7,942,079 B2 | 5/2011 | Russ | |
| 8,840,505 B2 | 9/2014 | Frait | |
| 9,347,373 B2 | 5/2016 | Menheere et al. | |
| 9,453,540 B2 | 9/2016 | Agner et al. | |
| 10,167,948 B2 | 1/2019 | Ghike et al. | |
| 2006/0276291 A1 | 12/2006 | Fabry et al. | |
| 2018/0022207 A1 * | 1/2018 | Eo | B60K 6/36 |
| | | | 74/661 |
| 2018/0045119 A1 | 2/2018 | Sheridan et al. | |
| 2018/0209513 A1 | 7/2018 | Lemmers, Jr. | |

OTHER PUBLICATIONS

Extended European search report issued in corresponding EP application No. 19210048.5, dated Jun. 16, 2020.

* cited by examiner

*Primary Examiner* — Victor L MacArthur
(74) *Attorney, Agent, or Firm* — Locke Lord LLP; Daniel J. Fiorello; Gabrielle L. Gelozin

(57) ABSTRACT

An engine system can include an engine having an engine shaft and a transmission that can include an input shaft connected to the engine shaft to rotate with the engine shaft, one or more rotating gears configured to rotate relative to the input shaft, and a synchromesh configured to selectively engage each of the one or more rotating gears to the input shaft. Transmission can include a second shaft comprising a clutch configured to selectively engage the one or more rotating gears to the second shaft to cause the second shaft to rotate with the one or more rotating gears.

19 Claims, 4 Drawing Sheets

TRANSMISSION SYSTEMS HAVING CLUTCH AT OUTPUT SIDE

BACKGROUND

1. Field

This disclosure relates to transmission systems, e.g., for aircraft low speed spool turbomachines.

2. Description of Related Art

Moving turbomachine accessories to be driven by the low speed spool requires a speed increasing transmission to take a large speed ratio and turn it into a tighter speed ratio band. One method of doing this is the use of a shifting transmission consisting of clutches that selectively engage different gear ratios. Since this load device can be a generator, it can represent a constant power load demand. This is different than what a traditional transmission encounters in use which is usually constant torque.

Such conventional methods and systems have generally been considered satisfactory for their intended purpose. However, there is still a need in the art for improved transmission systems. The present disclosure provides a solution for this need.

SUMMARY

An engine system can include an engine having an engine shaft and a transmission that can include an input shaft connected to the engine shaft to rotate with the engine shaft, one or more rotating gears configured to rotate relative to the input shaft, and a synchromesh configured to selectively engage each of the one or more rotating gears to the input shaft. Transmission can include a second shaft comprising a clutch configured to selectively engage the one or more rotating gears to the second shaft to cause the second shaft to rotate with the one or more rotating gears.

The clutch can be larger than the synchromesh. The clutch can be configured to operate in a tighter range of torque values than the synchromesh. The clutch can include any suitable clutch mechanism (e.g., a friction clutch having a bell housing assembly). The clutch can include a second shaft gear disposed thereon and meshed with a rotating gear of the one or more rotating gears.

The second shaft can be an output shaft configured to connect to one or more aircraft accessories. In certain embodiments, the second shaft can be connected to an output shaft via a gear pair, for example. Any other suitable number of shafts (e.g., a third shaft) and any other suitable number of synchronizers and/or large clutches is contemplated herein.

In certain embodiments, the engine can be an aircraft turbomachine. Any other suitable engine is contemplated herein.

In accordance with at least one aspect of this disclosure, a turbomachine transmission can include and suitable embodiment of a transmission as disclosed herein (e.g., as described above). Any other suitable components for the transmission are contemplated herein.

In accordance with at least one aspect of this disclosure, an aircraft system can include an engine having an engine shaft and a transmission as disclosed herein (e.g., as described above). The aircraft system can include an output shaft connected to the second shaft, and a load connected to the second shaft. Any other suitable components are contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
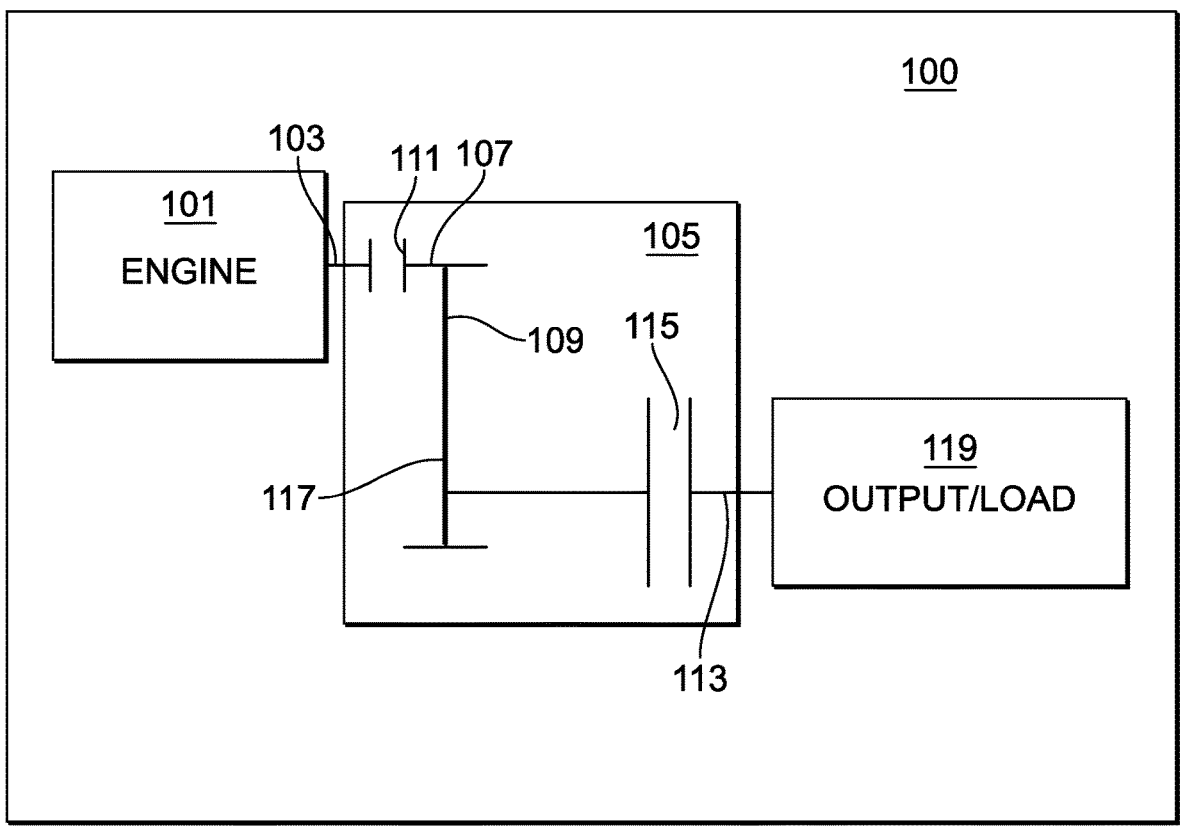
FIG. 1 is a schematic view of an embodiment of a system in accordance with this disclosure.
Figure 2:
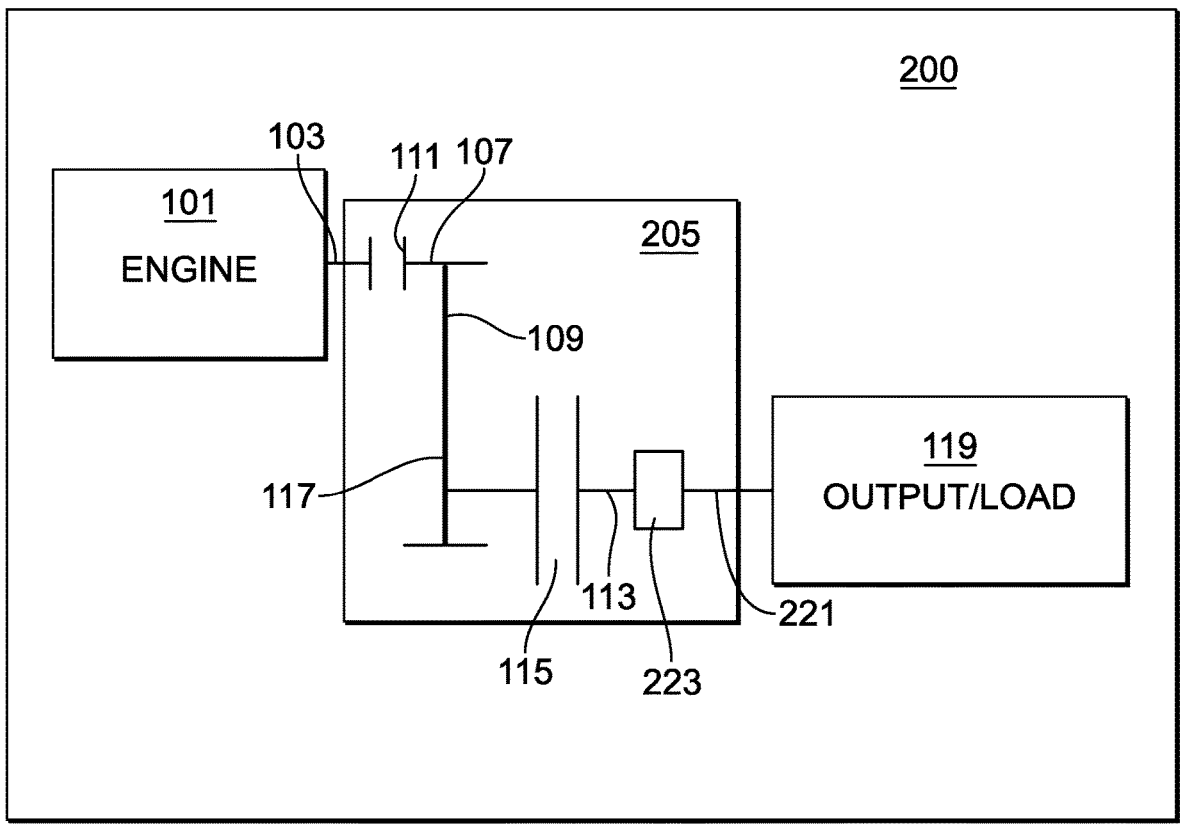
FIG. 2 is a schematic view of an embodiment of a system in accordance with this disclosure.
Figure 3:
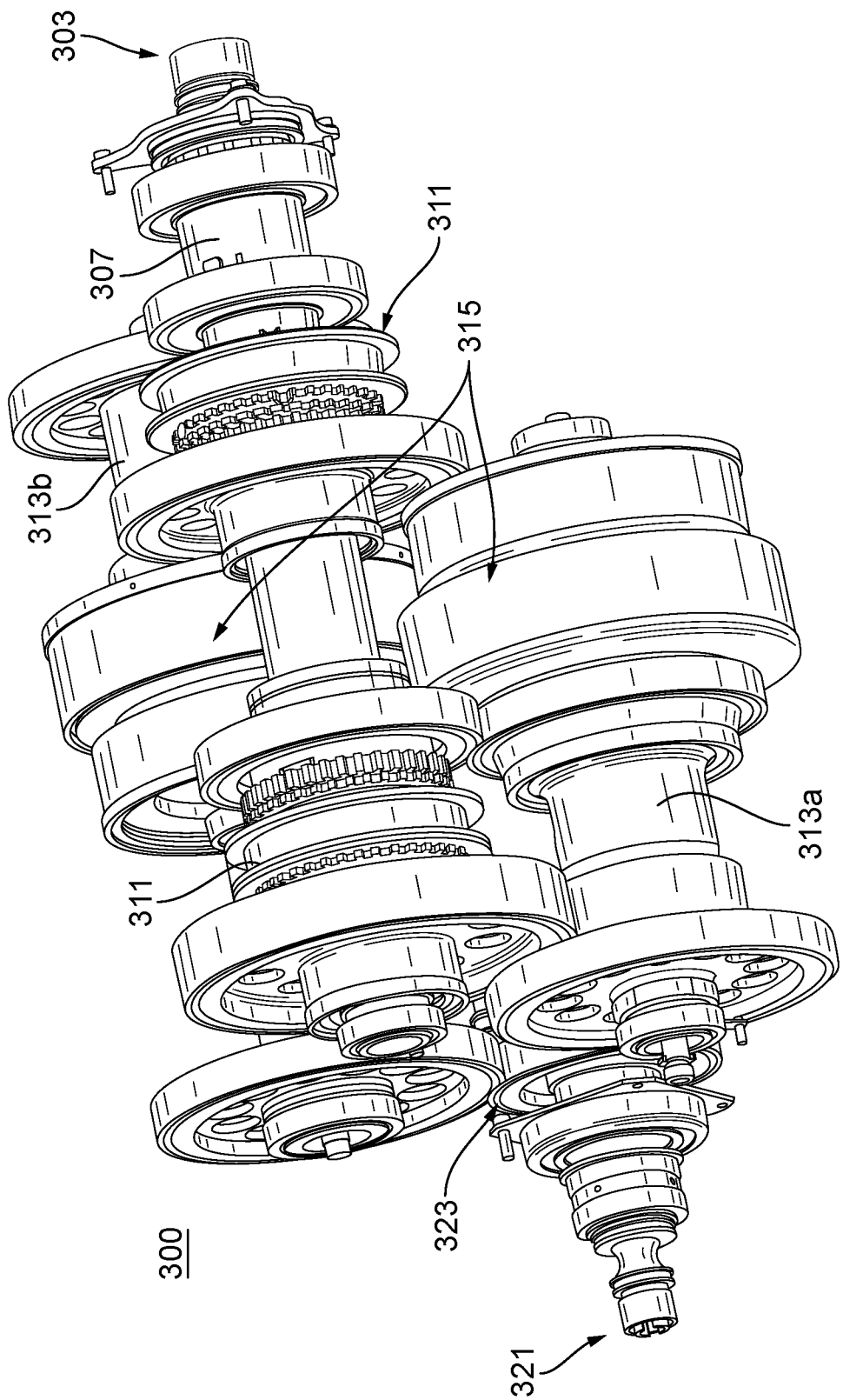
FIG. 3 is a perspective view of an embodiment of a transmission in accordance with this disclosure.
Figure 4:
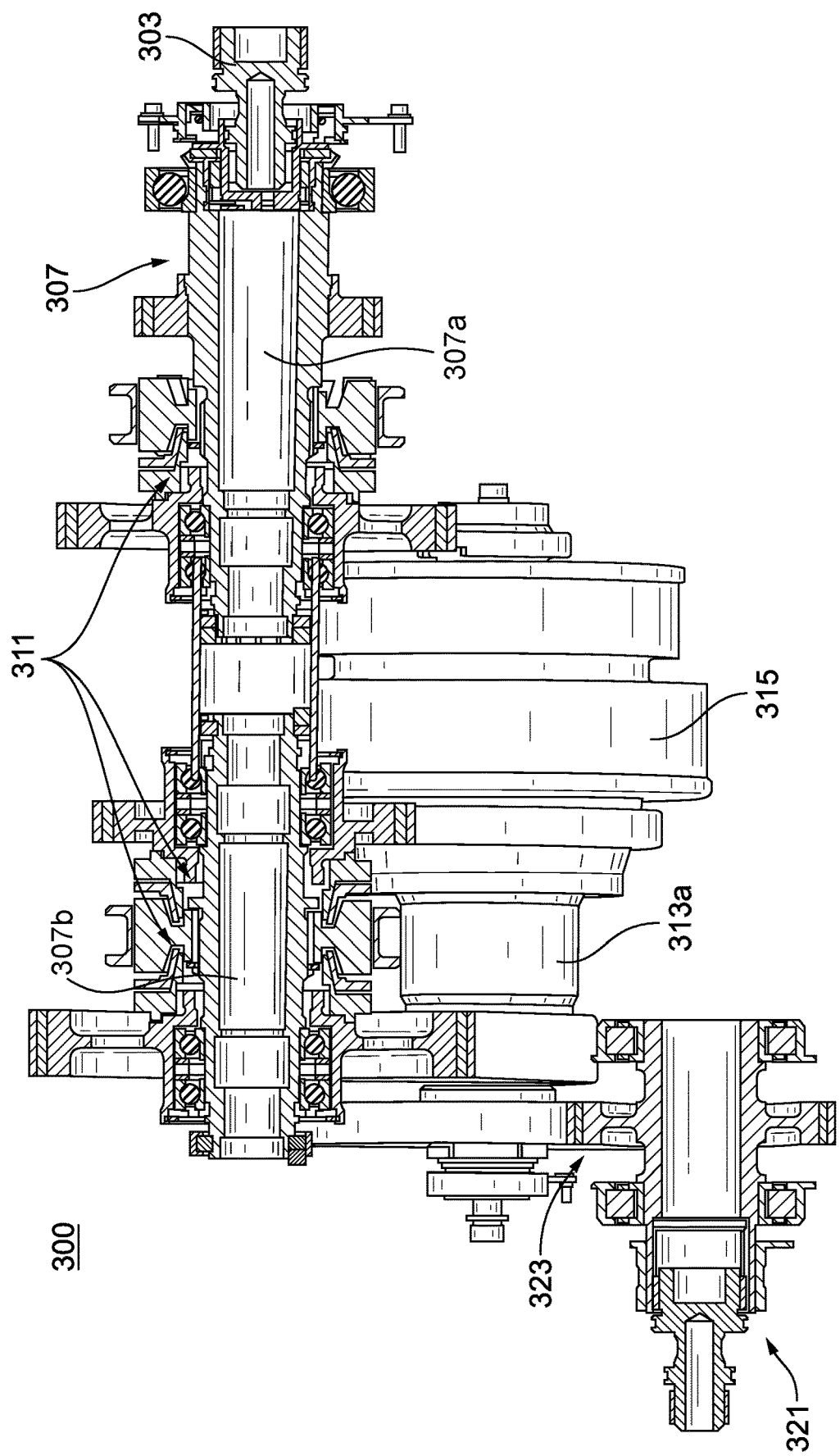
FIG. 4 is a cross-sectional view of the embodiment of FIG. 3, shown sectioned through the input shaft and the output shaft.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-4. Certain embodiments described herein can be used to reduce size and weight of aircraft systems and transmissions used therein.

Referring to FIG. 1, an engine system 100 can include an engine 101 having an engine shaft 103 and a transmission 105 that can include an input shaft 107 connected to the engine shaft 103 to rotate with the engine shaft 107 (e.g., at a same speed or a fixed gear ratio for example). The transmission 105 can include one or more rotating gears 109 configured to rotate relative to the input shaft 107. The transmission 105 can include a synchromesh 111 configured to selectively engage each of the one or more rotating gears 109 to the input shaft 107. The transmission 105 can include a second shaft 113 comprising a clutch 115 configured to selectively engage the one or more rotating gears 109 to the second shaft 113 to cause the second shaft 113 to rotate with the one or more rotating gears 109 (e.g., by driving a second shaft gear 117 attached to a housing of the clutch 115).

The clutch 115 can be larger than the synchromesh 111. The clutch 115 can be configured to operate in a tighter range of torque values than the synchromesh 111. The clutch 115 can include any suitable clutch mechanism (e.g., a friction clutch having a bell housing assembly, e.g., as shown in FIGS. 3 and 4). The clutch 115 can include a second shaft gear 117 disposed thereon and meshed with a rotating gear 109 of the one or more rotating gears 109.

The second shaft 113 can be an output shaft configured to connect to one or more aircraft accessories (e.g., any suitable load 119). In certain embodiments, as shown in FIG. 2, the second shaft 113 can be connected to an output shaft 221 via a gear pair 223, for example. Any other suitable number of shafts (e.g., a third shaft) and any other suitable number of synchronizers and/or large clutches and/or gears is contemplated herein.

For example, FIGS. 3 and 4 show an embodiment of a transmission 300 (e.g., a 4 stage transmission) having an input shaft 307 connectable to an engine shaft 303, a second shaft 313a, a third shaft 313b, a plurality of synchromeshes 311, a plurality of clutches 315, and each shaft 313a, 313b connected to an output shaft 321 via a gear ratio 323. The plurality of syncrhomeshes 311 can be on the input shaft, a first synchromesh 311 on a first portion 307a and a second synchromesh 311 on a second potion 307b of the input shaft 307. The components of transmission 300 can include any suitable embodiment thereof disclosed herein, e.g., as described above. Any other suitable components are contemplated herein.

In certain embodiments, the engine 101 can be an aircraft turbomachine. Any other suitable engine is contemplated herein.

In accordance with at least one aspect of this disclosure, a turbomachine transmission can include and suitable embodiment of a transmission as disclosed herein (e.g., as described above). Any other suitable components for the transmission are contemplated herein.

In accordance with at least one aspect of this disclosure, an aircraft system can include an engine having an engine shaft and a transmission as disclosed herein (e.g., as described above). The aircraft system can include an output shaft connected to the second shaft, and a load connected to the second shaft. Any other suitable components are contemplated herein.

A typical automotive transmission has the main/large clutch close to the engine. This is done because the torque band there is the tightest. Then power flows to synchromesh and gear ratios to the output. In certain turbomachine systems (e.g., for a low speed spool generator), this is the opposite and the greatest range of torque is at the engine. Therefore it may be best to place the clutch on the opposite side of the gear ratios than the turbomachine. Embodiments include the large clutch on the other side of the synchromesh and switched gear ratios. Therefore, the large clutch is closer to a constant torque. Embodiments can drastically reduce the size of the clutch, and in turn reduces the size of the transmission.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:
1. An engine system, comprising:
an engine having an engine shaft; and
a transmission comprising:
  an input shaft connected to the engine shaft to rotate with the engine shaft;
  one or more rotating gears on the input shaft configured to rotate relative to the input shaft;
  a plurality of synchromeshes on the input shaft configured to selectively engage each of the one or more rotating gears to the input shaft to rotate with the input shaft, wherein the plurality of synchromeshes includes a first synchromesh on a first portion of the input shaft and a second synchromesh on a second portion of the input shaft;
  a second shaft comprising a clutch configured to selectively engage the one or more rotating gears to the second shaft to cause the second shaft to rotate with the one or more rotating gears, wherein the clutch is disposed on the second shaft at a location between the first and second synchromeshes on the first and second portions of the input shaft.

2. The system of claim 1, wherein the clutch is larger than at least one synchromesh of the plurality of synchromeshes.

3. The system of claim 1, wherein the clutch is configured to operate in a tighter range of torque values than at least one synchromesh of the plurality of synchromeshes.

4. The system of claim 1, wherein the clutch includes a second shaft gear disposed thereon and meshed with a rotating gear of the one or more rotating gears.

5. The system of claim 1, wherein the second shaft is an output shaft configured to connect to one or more aircraft accessories.

6. The system of claim 1, wherein the second shaft is connected to an output shaft via a gear pair.

7. The system of claim 1, wherein the engine is an aircraft turbomachine.

8. A turbomachine transmission, comprising:
an input shaft configured to connect to an engine shaft to rotate with the engine shaft;
one or more rotating gears configured to rotate relative to the input shaft;
a plurality of synchromeshes on the input shaft configured to selectively engage each of the one or more rotating gears to the input shaft, wherein the plurality of synchromeshes includes a first synchromesh on a first portion of the input shaft and a second synchromesh on a second portion of the input shaft;
a second shaft comprising a clutch configured to selectively engage the one or more rotating gears to the second shaft to cause the second shaft to rotate with the one or more rotating gears wherein the clutch is disposed on the second shaft at a location between the first and second synchromeshes on the first and second portions of the input shaft.

9. The transmission of claim 8, wherein the clutch is larger than at least one synchromesh of the plurality of synchromeshes.

10. The transmission of claim 8, wherein the clutch is configured to operate in a tighter range of torque values than at least one synchromesh of the plurality of synchromeshes.

11. The transmission of claim 8, wherein the clutch includes a second shaft gear disposed thereon and meshed with a rotating gear of the one or more rotating gears.

12. The transmission of claim 8, wherein the second shaft is an output shaft configured to connect to one or more aircraft accessories.

13. The transmission of claim 8, wherein the second shaft is connected to an output shaft via a gear pair.

14. An aircraft system, comprising:
- an engine having an engine shaft; and
- a transmission comprising:
  - an input shaft connected to the engine shaft to rotate with the engine shaft;
  - one or more rotating gears configured to rotate relative to the input shaft;
  - a plurality of synchromeshes on the input shaft configured to selectively engage each of the one or more rotating gears to the input shaft, wherein the plurality of synchromeshes includes a first synchromesh on a first portion of the input shaft and a second synchromesh on a second portion of the input shaft;
  - a second shaft comprising a clutch configured to selectively engage the one or more rotating gears to the second shaft to cause the second shaft to rotate with the one or more rotating gears, wherein the clutch is disposed on the second shaft at a location between the first and second synchromeshes on the first and second portions of the input shaft;
  - an output shaft connected to the second shaft; and
  - a load connected to the second shaft.

15. The system of claim 14, wherein the clutch is larger than at least one synchromesh of the plurality of synchromeshes.

16. The system of claim 14, wherein the clutch is configured to operate in a tighter range of torque values than at least one synchromesh of the plurality of synchromeshes.

17. The system of claim 14, wherein the clutch includes a second shaft gear disposed thereon and meshed with a rotating gear of the one or more rotating gears.

18. The system of claim 14, wherein the second shaft is connected to the output shaft via a gear pair.

19. The system of claim 14, wherein the engine is an aircraft turbomachine.

\* \* \* \* \*